United States Patent [19]

Sankey

[11] 4,383,794
[45] May 17, 1983

[54] FRAME STRUCTURE FOR TRACK-TYPE VEHICLE

[75] Inventor: Edwin W. Sankey, Marion, Ohio

[73] Assignee: Dresser Industries, Inc., Dallas, Tex.

[21] Appl. No.: 311,625

[22] Filed: Oct. 15, 1981

Related U.S. Application Data

[63] Continuation of Ser. No. 204,283, Nov. 5, 1980, abandoned, which is a continuation of Ser. No. 948,648, Oct. 3, 1978, abandoned.

[51] Int. Cl.³ .................. E02F 3/75; B62D 11/04; B62D 55/10
[52] U.S. Cl. .................. 414/694; 305/17; 305/25
[58] Field of Search .............. 305/16, 17, 21, 25, 305/28, 31, 32; 494/694

[56] References Cited

U.S. PATENT DOCUMENTS

| | | | |
|---|---|---|---|
| 1,200,438 | 10/1916 | Jacoby et al. | 305/25 X |
| 1,296,309 | 3/1919 | Netzel | 305/25 X |
| 1,792,759 | 2/1931 | Polakoff | 305/32 |
| 2,487,397 | 11/1949 | Swennes | 305/25 X |
| 2,991,132 | 7/1961 | Schwartz et al. | 305/28 X |
| 3,501,034 | 3/1970 | Baron | 414/694 |
| 3,773,128 | 11/1973 | Bowen et al. | 305/28 X |
| 3,779,615 | 12/1973 | Kennicutt et al. | 305/31 |
| 3,872,939 | 3/1975 | Eckert | 305/28 |

*Primary Examiner*—David A. Scherbel
*Attorney, Agent, or Firm*—Gerald L. Lett

[57] ABSTRACT

A modular construction for a crawler assembly in track-type vehicles and a structural arrangement of the crawler assembly with the vehicle frame are described. In each crawler assembly there is a central side frame member which is integral with the vehicle frame and extends laterally from it for carrying the crawler track in the intermediate portion of its travel. Each central side frame member is equipped with upwardly-extending track support rollers carrying the crawler track while downwardly-extending track rollers are provided for guiding the crawler track and supporting the vehicle on the surface on which it is traveling. The idler roller is carried by a first modular member which is bolted to a first end of the side frame member. A second modular member carrying the crawler sprocket is bolted to the other end of the central side frame member. In order to provide track rollers immediately adjacent the idler roller and the crawler sprocket bogies are pivotally mounted, respectively, at each end of the central side frame member, and these bogies carry, respectively, a pair of track rollers. The bogies are arranged to extend, respectively, to points adjacent the idler roller and the crawler sprocket.

4 Claims, 4 Drawing Figures

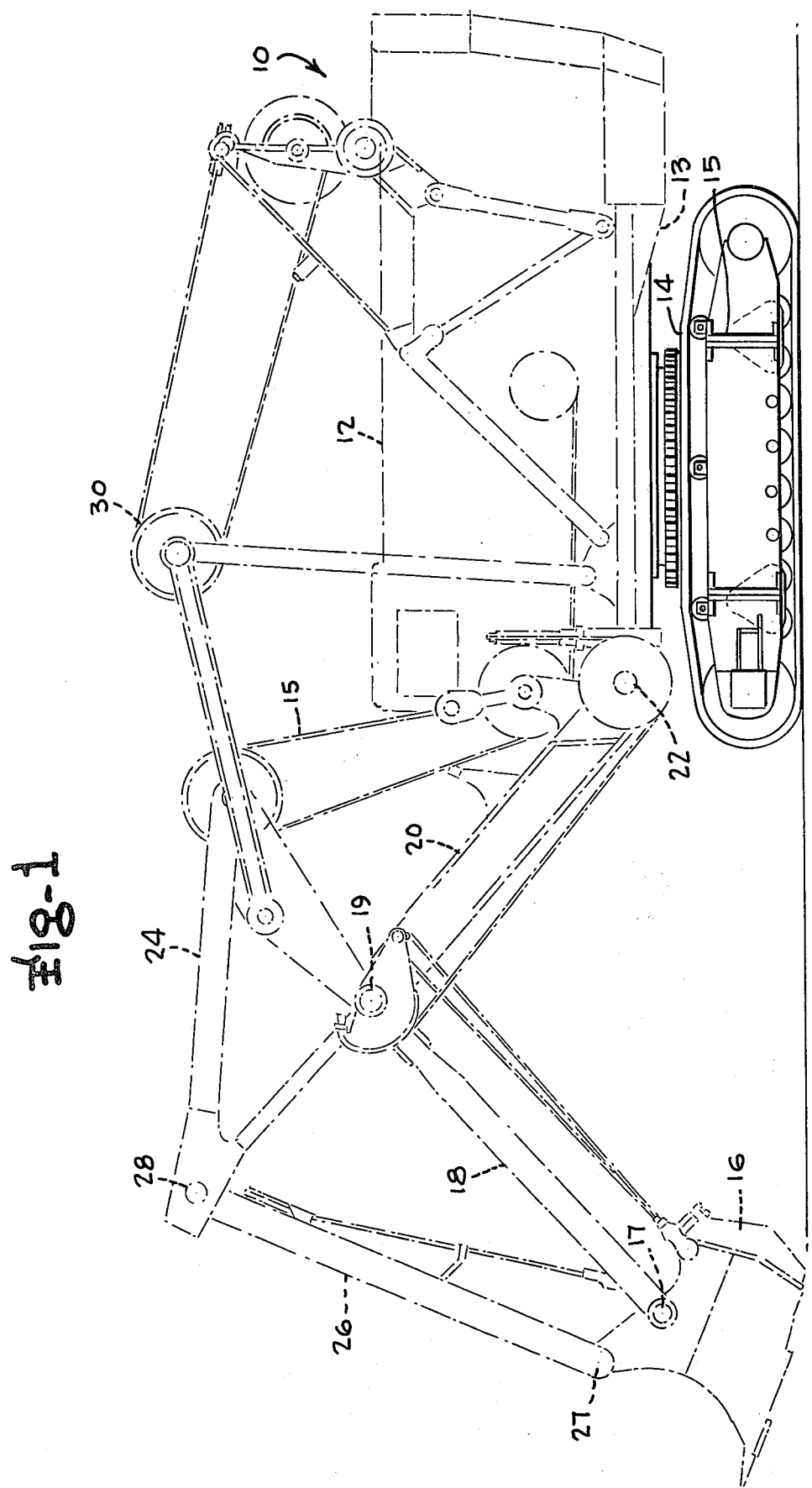

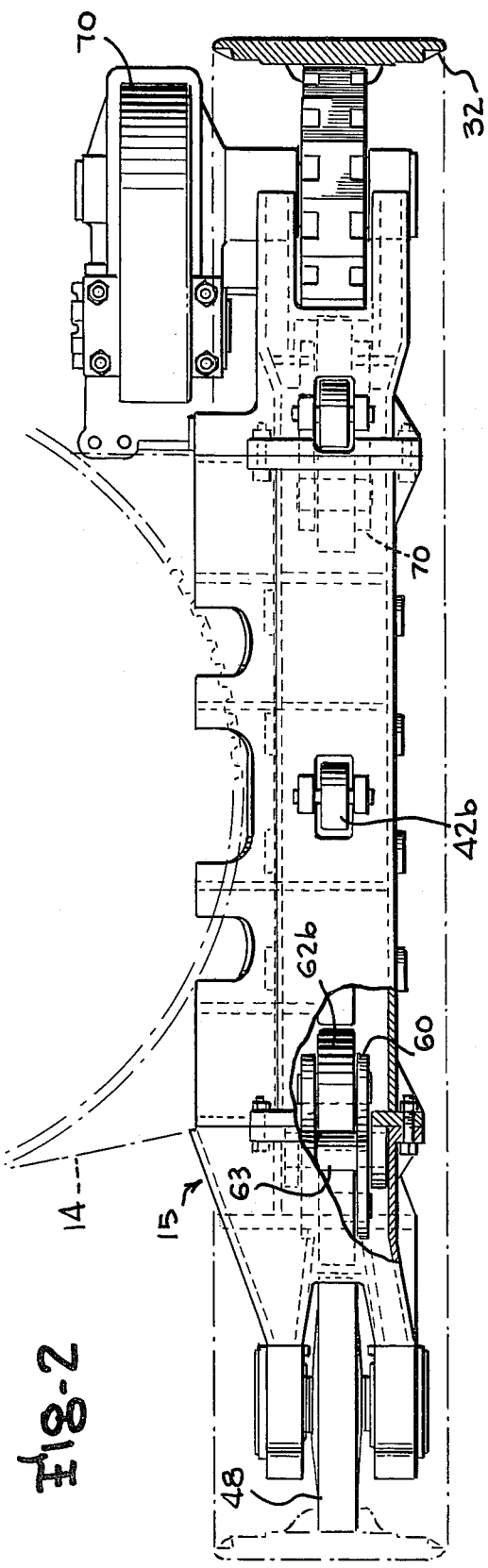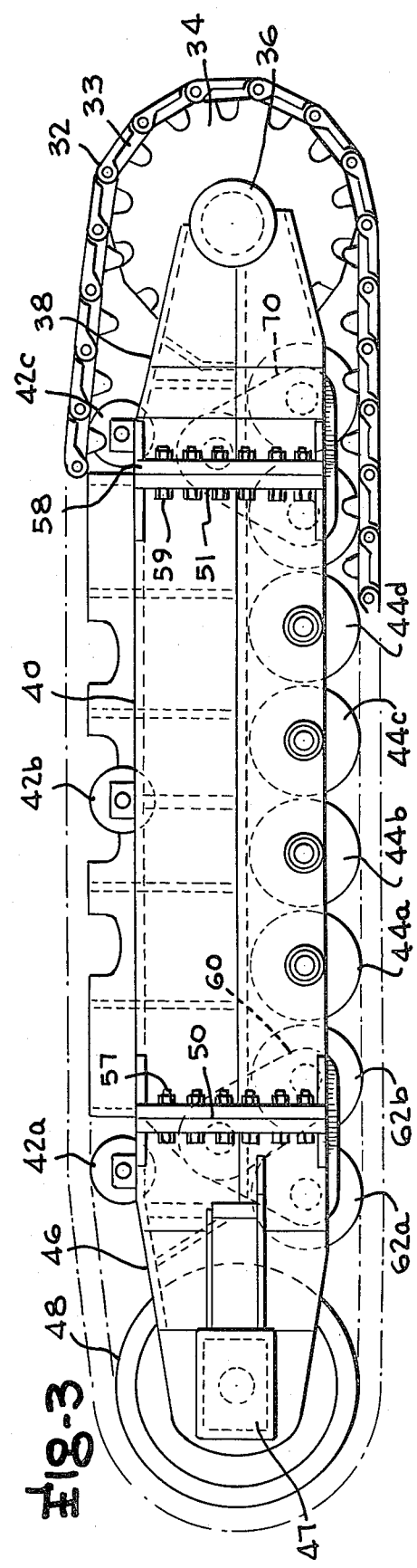

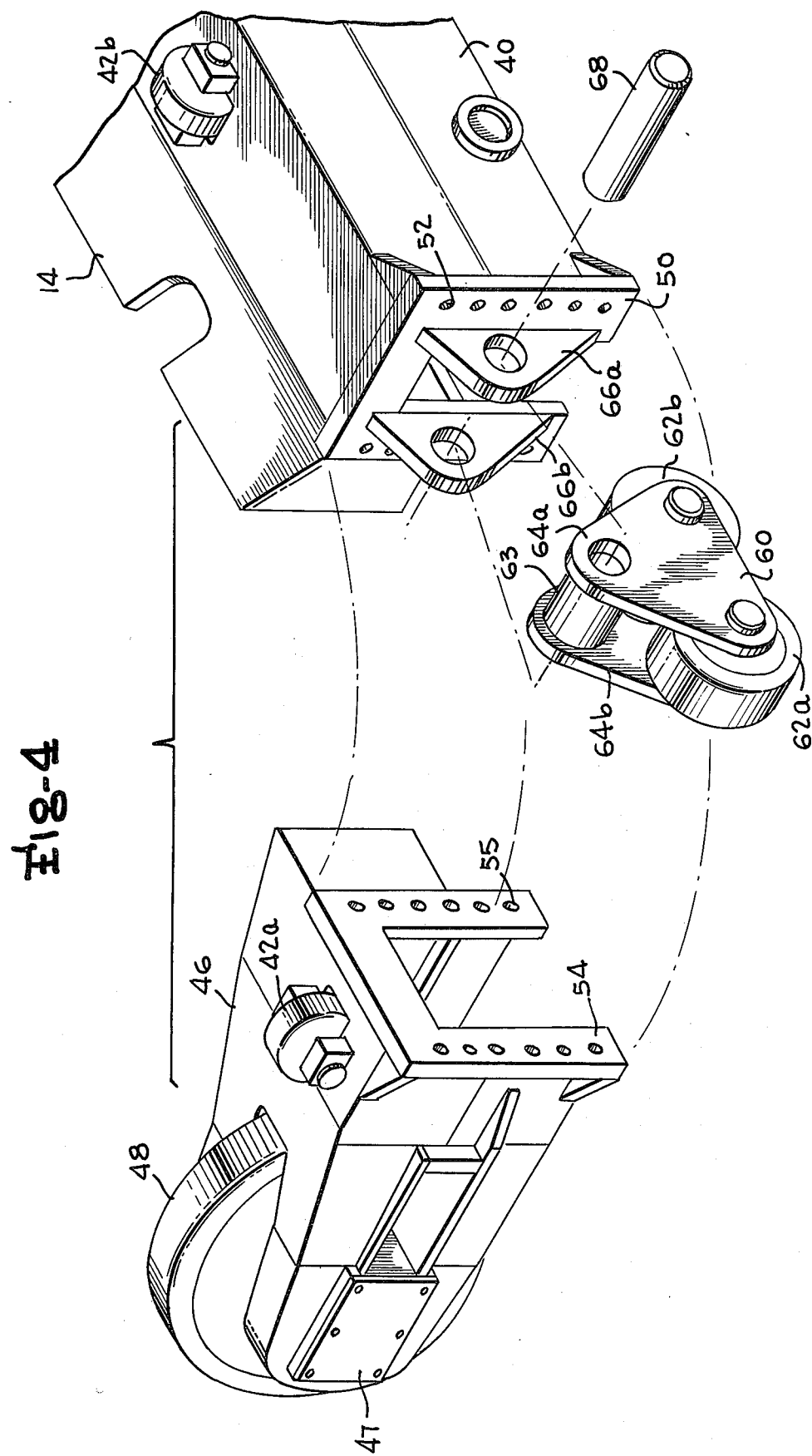

FRAME STRUCTURE FOR TRACK-TYPE VEHICLE

This is a continuation of application Ser. No. 204,283, filed Nov. 5, 1980, which is a continuation of application Ser. No. 948,648, filed Oct. 3, 1978 both now abandoned.

BACKGROUND OF THE INVENTION

This invention relates to a structural arrangement for a track frame and associated parts for crawler or track-type vehicles and to a structural arrangement of the track frame with the supporting frame for the vehicle.

In crawler or track-type vehicles particularly those which require erection in the field, such as power shovels, in order to facilitate shipment crawler side frames including the drive sprocket for the track, idler roller and supporting track rollers are conventionally manufactured as completely separate items which are subsequently to be bolted or otherwise attached to a supporting frame or undercarriage for the vehicle. In considering the load transmission characteristics of such a structure it can be seen that this creates a chain of connected structures, and each link in the chain of connected structures is required to withstand the entire design load. For example, the track rollers supporting a crawler track receive loads through the side frames carrying the track, from the lower frame or undercarriage of the vehicle. Each of the structures and connections must be designed to handle the maximum load conditions. Accordingly, this form of construction for track-type vehicles is unduly complex and expensive by reason of the number of separate portions of the structure which must be designed and constructed to carry the entire design load.

With regard to those types of crawler or track-type vehicles which must be assembled in the field it is conventional to manufacture and ship the entire crawler frame structure including the sprockets and idle rollers which must carry the track as an integral unit which is subsequently attached to the supporting frame or undercarriage of the vehicle. Particularly with regard to the larger vehicles of this type, i.e., power shovels, these crawler frames are exceedingly long and heavy for shipping purposes and thereby difficult and expensive to handle. It has been suggested in the prior art that the foregoing problem can be solved by making the drive portion of the crawler frame, i.e., the crawler sprocket and associated gearing and drive motor a separate modular portion of the crawler frame. However, in so doing, unsatisfactory provision is made for providing track rollers which will prevent those lower portions of the track adjacent the crawler sprocket from buckling, or stated another way, insufficient provision is made for load equalization along the entire length of the lower portion of the track between the crawler sprocket and the front idler roller.

It is, therefore, an object of the invention to provide a crawler or track frame structure in which satisfactory provision is made for load equalization along the entire length of the lower portion of the crawler track from idler roller to crawler sprocket.

It is another object of this invention to provide for a track-type vehicle a main frame and crawler frame structure which for load transmission purposes is an integral structure.

A further object of this invention is to provide in a modularized crawler frame structure an arrangement for a track roller or rollers adjacent the idler roller and crawler sprockets which provides for greater load equalization and which can respond to changes in level of the track as it proceeds from the idler roller or to the crawler sprocket.

SUMMARY OF THE INVENTION

The foregoing and other objects are obtained in a track-type vehicle of the type here in question wherein the crawler side frame structures are constructed in modular form with the portions carrying the idler roller and the driven crawler sprocket for each crawler structure being bolted to opposite ends of a central side frame member carrying the track rollers. The central side frame member is an integral part of the supporting frame structure for the vehicle in question. Track rollers immediately adjacent the idler roller and the crawler sprocket in each crawler frame structure are provided through the use of bogies pivotally mounted at each end of the central side frame member so as to rest on those portions of the lower track which are immediately adjacent the idler roller and the crawler sprocket.

BRIEF DESCRIPTION OF THE DRAWINGS

The principles of the invention will be more readily understood by reference to the description of a preferred embodiment given hereinbelow, which preferred embodiment is described in the context of the use of the invention on a power shovel, the drawings illustrating the described embodiment are briefly described as follows:

FIG. 1 is a side elevation of a power shovel typical of those on which the invention might be used;

FIG. 2 is a top elevation and broken view of the supporting or lower frame structure and one crawler frame structure for the power shovel illustrated in FIG. 1;

FIG. 3 is a side elevation of the FIG. 2 view; and

FIG. 4 is an exploded, partial view of the forward portion of the FIG. 2 embodiment.

DETAILED DESCRIPTION OF THE PREFERRED EMBODIMENT

In FIG. 1 is shown a power shovel 10 which is typical of a vehicle on which the invention might be used. The overall construction of the power shovel forms no part of this invention and such a power shovel is described in detail in U.S. Pat. No. 3,501,034.

Power shovel 10 is equipped with a body 12 supported for rotation on a lower or supporting frame 14. The shovel can be moved from place to place by operation of a pair of laterally-spaced and parallel endless crawler or track assemblies 15, only one of which is shown in FIG. 1. The crawler assembly is described hereinbelow in greater detail in connection with FIGS. 2-4. The body can be rotatably moved to swing from side to side by suitable power means mounted within the housing of body 12.

A bucket or dipper 16 is pivotally connected at 17 to a handle 18 which is in turn pivotally connected to a stiffleg 20 by a head shaft 19. The stiffleg is pivotally connected to the machine body by foot pins 22. A hoist frame 24 is also connected to head shaft 19, and a hoist link 26 ties the hoist frame to dipper 16 by pivots 27 and 28. The hoist frame, hoist link, handle and dipper move as a unit about the head shaft, and there is no relative movement among these parts except when the dipper moves about its pivotal connection 17 with the handle in changing pitch. A hoist line 15 controls movement of the hoist frame about the head shaft, and a crowd mechanism generally indicated by the reference numeral 30 controls movement of the hoist frame and stiffleg about its foot pins.

As stated, this power shovel is mounted for movement on crawler structures 15 which are carried by a supporting or lower frame 14. The details of construction of the crawler assembly and its relationship to the supporting frame 14 are described below.

FIGS. 2 and 3 illustrate in detail the construction of one of the crawler assemblies necessary to carry the above-described power shovel or other similar type vehicle. FIG. 2 illustrates the relationship of that crawler assembly to the supporting frame 14 as well as to the mechanism for driving that crawler assembly.

An endless crawler track 32 formed of a plurality of crawler shoes 33 extends around and is driven by a crawler sprocket 34 at one extremity of the travel of the crawler track. Track 32 extends around, at the other extremity of its travel, an idler roller 48. These parts are carried by the crawler side frame structure 15 formed of central side frame member 40 and modules 38 and 46.

The major portion of the crawler side frame structure is constituted by the central side frame member 40 which, as is most apparent from FIG. 2, is an extension of and integral with the supporting frame 14 for the vehicle. In the latter case, the supporting frame 14 constitutes the lower frame of the power shovel described above. Central side frame member 40 carries a plurality of track rollers 44a through d which distribute the weight of the vehicle along that portion of the length of the lower portion of track 32 which is coextensive with the length of central side frame member 40. The central side frame member 40 additionally carries at least one upwardly extending track roller 42b for supporting track 32 in the upper portion of its travel. Central side frame member 40 terminates at its ends in flange members 50 and 51 which, respectively, contain a series of bolt holes, such as bolt holes 52 illustrated in connection with flange member 50 in FIG. 4.

In the illustrated embodiment the front portion of the crawler assembly is completed by a module 46 which rotatably carries about pivot 47 an idler roller 48. In addition, module 46 has mounted thereon a support roller 42a which supports the upper portion of the track at this portion of its path. Module 46 terminates at its rear end in a flange member 54 which fits flush with flange member 50 and contains bolt holes 55 which are co-linear with the bolt holes 52 on central side frame member flange 50. Thus, module 46 can readily be bolted to central side frame member 40 by means of the series of bolts 57.

The rearward portion of the crawler assembly in this embodiment is completed by a module 38 which rotatably carries a crawler sprocket 34 mounted on the module by means of axle 36. In addition, module 38 includes a housing 70 in which can be mounted the driving mechanism for the crawler sprocket in the form of a drive motor and suitable reduction gears. This module is equipped with a support roller 42c which carries the upward portion of the track at this point in its travel.

In a like manner as described hereinabove in connection with module 46 this module is bolted to the rearward flange member 51 of central side frame member 40. Thus, a flange member 58 which fits flush with flange member 51 is provided on module 38, and the two are bolted together by means of the series of bolts 59.

As is clear from viewing the drawings, the track rollers 44a through 44d provide no support for the track in those portions of its travel between those track rollers and, respectively, the idler roller 48 and the crawler sprocket 34. In the rough terrain which is usually encountered by vehicles of this type without further provision the track would buckle under many circumstances, and repeated action of this type would likely cause severe damage to the track. Therefore, it is necessary that some additional support be provided and this support must be provided in a way which will most nearly accommodate the natural motion of the track, at those points of its travel, where, for example, in forward travel, it is just issuing from the idler roller or being picked up by the crawler sprocket 34.

In the crawler assembly illustrated in FIGS. 2 and 3 this additional support is provided by bodies 60 and 70 which each carry a pair of additional track rollers in the manner shown. The relationship of bogie 60 to the remainder of the structure and its construction are described in greater detail hereinbelow.

Referring to FIG. 4 it is seen that bogie 60 is formed of a pair of triangular members 64a and 64b which at the two lower corners have pivotally mounted therein track rollers 62a and 62b. The upper corner of the bogie structure is equipped with a bushing 63 which extends between the triangular members 64a and 64b.

The interior vertical portions of flange member 50 of central side frame member 40 are equipped with bosses 66a and 66b having holes therein through which a pin 68 can be inserted while being inserted through the bushing 63 of bogie 60. Accordingly, the bogie 60 is pivotally carried by the central side frame member so as to allow it to accommodate to the particular motions or slight changes in level of the track at this portion of its travel. In addition, by virtue of the construction and arrangement of bogie 60, the track roller 62a and 62b are so mounted and positioned that they provided the needed buckling prevention as well as additional load equalization along the length of the track.

The preferred embodiment of the invention described hereinabove is intended only to be exemplary of the principles of the invention. Accordingly, it is contemplated that the specific structure of the described embodiment might be changed in a variety of ways known to those skilled in the art without departing from the spirit and scope of the invention as defined by the appended claims.

I claim:

1. In a track-type vehicle operating on endless crawler tracks, each said crawler track extending around and being driven by a crawler sprocket at one extremity of its travel and extending around an idler roller at its other extremity of travel, and having drive means for said crawler sprocket and at least a pair of crawler side frame assemblies, each crawler side frame assembly comprising:

a central side frame member extending laterally from and being integral with a supporting frame for the vehicle and carrying the said crawler track through the intermediate portions of its travel, said side frame member having at least one upwardly extending track support roller carrying said crawler track in a first direction of travel and downwardly extending track rollers guiding said track in a second direction of travel and supporting said vehicle on the surface on which it is traveling, a first modular member rotatably carrying at least said idler roller, said first modular member being detachably secured to a first end of said side frame member, a second modular member carrying at least said crawler sprocket, said second modular member being detachably secured to a second end of said side frame member and first and second additional track roller means, respectively, mounted on said first and second ends of said crawler side frame assembly so as to extend across the point where said modular members are secured to said ends of said side frame member to support said crawler track in portions of its travel, respectively, between said idler roller and the next adjacent track roller on said central side frame member and between said crawler sprocket and the next adjacent track roller on said central side frame member.

2. The crawler side frame assembly defined in claim 1 wherein said additional track roller means are bogies pivotally connected, respectively, to said first and second ends of said side frame member, each said bogey having rotatably mounted therein a pair of additional track rollers, said additional track rollers supporting said crawler track.

3. The crawler side frame assembly defined in claim 2 further comprising bosses extending from said first and second ends of said side frame member for receiving pins extending, as well, through said bogies thereby pivotally connecting said bogies to said side frame member.

4. In a power shovel having an upper frame supporting a body and rotatably mounted on a lower frame, a stiffleg pivotally connected at its lower end to the body, a dipper handle pivotally connected at its upper end to the upper end of the stiffleg, a dipper pivotally connected at the lower end of said dipper handle, means for raising and lower said stiffleg about its pivotal connection to the body, means for swinging said dipper handle about its pivotal connection to said stiffleg and a pair of crawler assemblies for moving the power shovel from place to place, each said crawler assembly comprising an endless crawler track formed of interconnected crawler shoes and extending, respectively, around an idler roller and a crawler sprocket, each said crawler assembly further comprising:

a central side frame member for carrying said track in the intermediate portions of its travel, said central side frame being formed integrally with and as an extension of said lower frame of said power shovel, said central side frame member having rotatably mounted thereon at least one track support roller and a plurality of track rollers which receive a substantial portion of the design load of the power shovel, a first modular member detachably secured to and forming an extension from one end of said central side frame member, said first modular member having said idler roller rotatably mounted thereon, a second modular member detachably secured to and forming an extension from the other end of said central side frame member, said second modular member having said crawler sprocket rotatably mounted thereon, first and second additional track roller means pivotally mounted on the ends of said central side frame member and placed, respectively, so as to bear on said track at those sections of the lower portion of its travel between, respectively, said idler roller and said track rollers and said crawler sprocket and said track rollers so as to carry the remaining portion of the design load of the power shovel, and bosses extending from the end faces of said central side frame member on which said first and second additional track roller means are mounted.

* * * * *